United States Patent [19]

Fletcher et al.

[11] 3,798,741

[45] Mar. 26, 1974

[54] METHOD OF FABRICATING AN OBJECT WITH A THIN WALL HAVING A PRECISELY SHAPED SLIT

[76] Inventors: James C. Fletcher, Administrator of the National Aeronautics and Space Administration with respect to an invention of; P. A. Christopher; W. J. Gross; W. H. Henley; B. D. Swirsky

[22] Filed: Mar. 13, 1973

[21] Appl. No.: 340,864

[52] U.S. Cl. .............................................. 29/423
[51] Int. Cl. .............................................. B23p 17/00
[58] Field of Search ....... 29/423, 156.8 H, 557, 558

[56] References Cited
UNITED STATES PATENTS

| | | | |
|---|---|---|---|
| 2,544,934 | 3/1951 | Nase | 250/27.5 |
| 3,043,147 | 7/1962 | Will, Jr. | 74/5 |
| 3,461,524 | 8/1969 | Lepselter | 29/423 X |
| 3,564,682 | 2/1971 | Carroll, Jr. et al. | 29/25.17 |

*Primary Examiner*—Charles W. Lanham
*Assistant Examiner*—V. A. DiPalma
*Attorney, Agent, or Firm*—John R. Manning; Howard J. Osborn; Wallace J. Nelson

[57] ABSTRACT

A method of making a structure having a cavity and having a thin wall with a precisely shaped slit. An object having a cavity having two openings, one of which is to be closed by a thin wall with a slit, is placed on the surface of a fixture. The fixture surface has a slot conforming to the size and shape of the slit to be formed in the thin wall, and a shim member is inserted into the slot such that it extends into the slot a distance deeper than the desired thickness of the thin wall and such that it extends above the surface of the fixture and into the cavity of the superposed object. The object and fixture are fixed in position with the slot properly located in the position of the slit to be formed, and the cavity is filled with a molten settable material from its other end. After the molten material has set, the object is separated from the fixture, the shim adhering to the set composition in the cavity of the object. The surface of the object which was adjacent the fixture is then provided with a plated metal layer over the opening to be provided with a thin wall. The plated layer is then machined such that the layer, in the area covering the cavity opening, has the desired thickness of the thin wall being provided. The settable material is then melted out. The shim is then removed by selective etching to produce the desired structure.

10 Claims, 6 Drawing Figures

PATENTED MAR 26 1974 3,798,741

METHOD OF FABRICATING AN OBJECT WITH A THIN WALL HAVING A PRECISELY SHAPED SLIT

The invention described herein was made in the performance of work under a NASA contract and is subject to the provisions of Section 305 of the National Aeronautics and Space Act of 1958, Public Law 85-568 (72 STAT. 435; 42 U.S.C. 2457).

BACKGROUND OF THE INVENTION

This invention relates to a method of fabricating a structure having a cavity closed by a thin wall having a thin slit extending therethrough.

The difficulties in machining apertures, particularly slit apertures, in thin cavity walls having a thickness of from 0.0005 to 0.05 inches is well known. Such difficulties are increased where the cavity is of complex shape such as where access to a large cavity is through a narrow opening or channel.

One particular aspect of this problem is to provide a fluidic element for sensing the position of a gyroscope rotor. The element includes an enlarged cavity portion closed by a thin wall having a precisely shaped slit. The element also includes a small cavity portion opening at one end to an outer surface of the element and at its inner end to the larger cavity. It is thus difficult to gain access to the inner cavity with tools which would be otherwise useful in providing a slit in the thin wall of the enlarged cavity. In use, a surface of a gyroscope rotor partially covers the slit, and it is necessary that the slit is precisely shaped for effective operation. Conventional techniques for cutting the slit, such as machining with a slitting saw or photo etching, are not feasible for fabricating this element.

It is an object of the present invention to provide a method of forming an element having a cavity closed by a thin wall having a precision shaped slit therethrough. It is a further object to provide such object of metal. It is still a further object to provide such metal object where the thickness of the thin wall is from 0.0005 to 0.05 inches.

BRIEF SUMMARY

The foregoing and other objects which will be apparent to those of ordinary skill in the art are achieved according to the present invention by providing a method of forming an element having a cavity, the cavity having in at least one portion a thin wall with a precision shaped slit therethrough comprising the steps of providing a first member having a cavity therein, the cavity being open at a first surface and at a second surface, the opening at the second surface being the portion of the cavity which is to be provided with the thin wall with the precision shaped slit, providing a second member having a surface for receiving the second surface of the first member, the surface of the second member having a slot therein, the cross sectional area of the slot determining the cross sectional area of the slit to be provided in the thin wall of the cavity, the depth of the slot being greater than the desired thickness of the thin wall, inserting a shim member in the slot, the shim member filling the cross sectional area of the slot for a distance greater than the desired thickness of the thin wall and extending above the surface of the second member, positioning the first member on the second member such that the second surface of the first member is adjacent the surface of the second member, such that the portion of the shim extending above the surface of the second member extends into the cavity, and such that the slot is located relative to the cavity in the desired position of the precision shaped slit, filling the cavity with a molten, settable material composition having a melting point lower than that of the first member, the second member, and the shim member, permitting the molten settable composition to set to a solid, separating the first member from the second member, the shim member remaining with the first member due to its adhesion to the solid material set in the cavity, plating a metal layer on the second surface of the first member, the thickness of the plated layer overlying the cavity being greater than the desired thickness of the thin well, the plated metal having a higher melting point than that of the set material in the cavity, machining the plated layer such that the thickness thereof overlying the cavity is equal to the desired thickness of the thin wall, heating the first member to melt the set material, the shim member being held in place by adhesion to the plated layer, removing the melted material from the cavity, and removing the shim member from said cavity to provide the element, the thin wall being formed by the machined, plated, layer, and the precisely shaped slit being formed by the removal of the shim member from the machined, plated layer.

DETAILED DESCRIPTION

There follows a detailed description of a preferred embodiment of the invention, together with accompanying drawings. However, it is to be understood that the detailed description and accompanying drawngs are provided solely for the purpose of illustrating a preferred embodiment and that the invention is capable of numerous modifications and variations apparent to those skilled in the art without departing from the spirit and scope of the invention.

Figure 5:
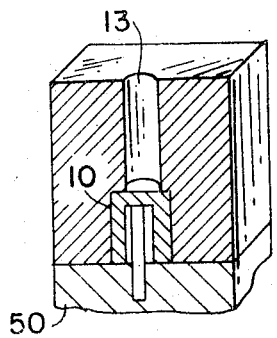
FIG. 5 is a diagrammatic perspective sectional view of the element of FIG. 1 after being separated from the element of FIG. 3 and provided with a metal plated layer.
Figure 6:
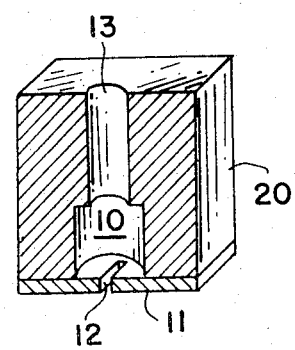
FIG. 6 is a diagrammatic perspective sectional view of an element having a cavity closed with a thin wall having a slit therethrough according to the present invention.

FIG. 6 shows the final element produced by the present invention. The element includes a cavity 10 having a thin wall 11 (in this case 0.001 inches) having a precision shaped slit 12 (in this case 0.002 inches wide). The element is made by a process illustrated in FIGS. 1-5 as described below.

A first metal member 20 (FIG. 1) is provided having a cavity 10 open at a first surface 21 of element 20 and open at a second surface 22 of element 20, the opening 23 at surface 22 being the portion of cavity 10 which is to be provided with thin wall 11 having slit 12. A second member 30 is provided having a surface 31 for receiving surface 22 of member 20. Surface 31 has a slot 36 having a cross sectional area the same as that desired for slit 12 and having a depth greater than the thickness of wall 11.

Figure 1:
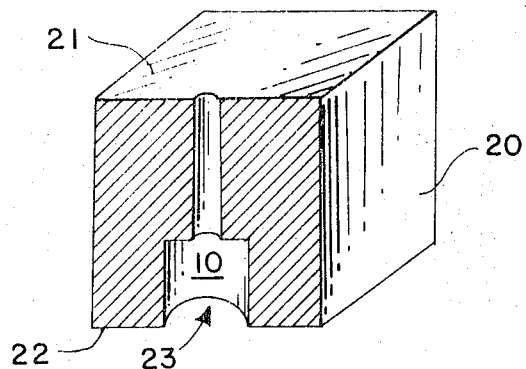
FIG. 1 is a diagrammatic sectional perspective view of a member including a cavity to be closed with a thin wall having a slit therethrough.
Figure 2:
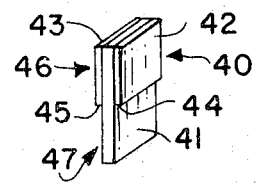
FIG. 2 is a diagrammatic perspective view of a shim member used in the method of the present invention.
Figure 3:
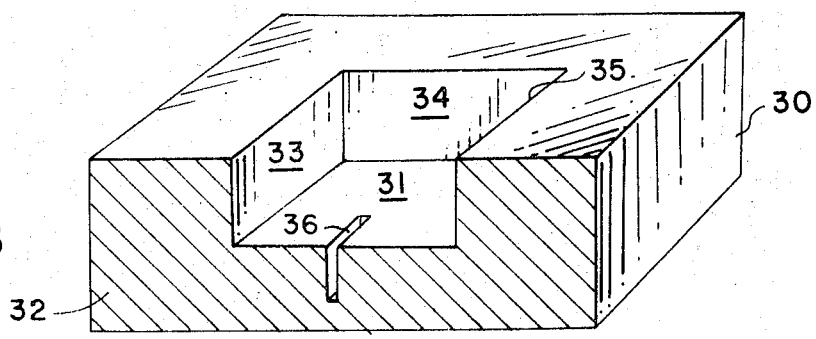
FIG. 3 is a diagrammatic perspective sectional view of a fixture member used in the method of the present invention.

FIG. 2 shows a metal laminate shim 40 including a central sheet piece 41 having a cross sectional area the same as that desired for slit 12, and two outer sheet pieces 42, 43, each having a thickness of 0.001 inches and forming shoulders 44, 45 with central piece 41. Central piece 41 extends beyond shoulders 44, 45 a distance greater than the thickness of wall 11 and not greater than the depth of slot 36.

Figure 4:
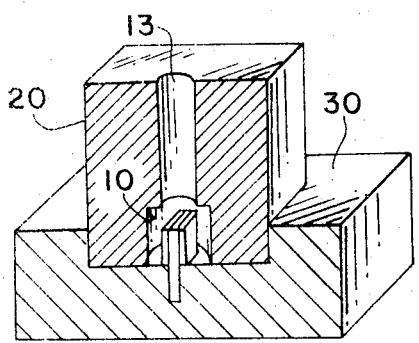
FIG. 4 is a diagrammatic perspective sectional view of the elements of FIGS. 1, 2 and 3 assembled together.

The lower portion of shim 40 is inserted into slot 36 as shown in FIG. 4 with shoulders 44, 45 abutting surface 31 of member 30. Member 20 is then positioned on member 30 as shown in FIG. 4 such that surface 22 of member 20 is adjacent surface 31 of member 30 with the upper portion 46 of shim member 40 extending into cavity 10, and with slot 36 is located relative to cavity 10 in the desired position of slit 12. Member 30 is conveniently provided with means, such as walls 33, 34 and 35 to hold member 20 in this position for the next step of the process.

Cavity 10 is then filled, through opening 13, with a molten settable metal material having a relatively low melting point. Surface 31 of member 30 can be provided with a suitable release coating in the event that the set metal material tends to adhere thereto. After the material in cavity 10 has set solid, member 30 is removed and the lower (in the sense of FIG. 4) surface of element 30 is electro plated with a layer 50 of nickel or other suitable metal thicker than the desired thickness of wall 11 as shown in FIG. 5.

The plated layer is then machined such that the thickness of wall 11 in the area closing cavity 10 is the desired thickness, in this case 0.001 inch. Since the extended portion 47 of shim 40 extends further than 0.001 inch, the machining operation will cut through extended portion 47.

The object is now heated to melt out the set metal composition and it will be apparent that the plated metal layer 50, metal shim 40, and metal element 20 all have a higher melting point than that of the set metal composition.

Shim 40 is removed by selective chemical etching, the material of shim 40 being different from that of element 20 and layer 50 and selectively attacked by the etchant.

The invention has particular application to structures in which wall 11 is not thicker than 0.05 inches and in which slit 12 is not wider than 0.05 inches. In general, wall 11 will be from 0.0005 to 0.05 inches in thickness and slot 12 will be from 0.0005 to 0.05 inches in width.

While wall 11 has been shown flat and uniform in cross section, it will be understood that it can take any desired shape. For example, the bottom area of shim 40 may be concave and when plated metal layer 50 is machined, it may be machined concave to provide a concave wall of uniform or varied cross section as desired. Alternatively, the outer surface of layer 50 could be machined flat or convex. It will thus be understood that the cross section of wall 11 in the finished article may have virtually any desired cross section. Furthermore, of course, a plurality of slits of desired shape can be formed in any wall.

What is claimed is:

1. A method of forming an element having a cavity, said cavity having in at least one portion a thin wall with a precision shaped slit therethrough comprising the steps of:

providing a first member having a cavity therein, said cavity being open at a first surface and at a second surface, the opening at said second surface being the portion of the cavity which is to be provided with said thin wall with said precision shaped slit;

providing a second member having a surface for receiving said second surface of said first member, said surface of said second member having a slot therein, the cross sectional area of said slot determining the cross sectional area of the slit to be provided in said thin wall of said cavity and the depth of said slot being greater than the desired thickness of said thin wall;

inserting a shim member in said slot, said shim member filling the cross sectional area of said slot for a distance greater than the desired thickness of said thin wall and extending above said surface of said second member;

positioning said first member on said second member such that said second surface of said first member is adjacent said surface of said second member, such that the portion of said shim extending above said surface of said second member extends into said cavity, and such that the slot is located relative to said cavity in the desired position of said precision shaped slit;

filling said cavity with a molten, settable material composition having a melting point lower than that of said first member, said second member, and said shim member;

permitting the molten settable composition to set to a solid;

separating said first member from said second member, said shim member remaining with said first member due to its adhesion to the solid material set in said cavity;

plating a metal layer on said second surface of said first member, the thickness of said plated layer overlying said cavity being greater than the desired thickness of said thin wall, said plated metal having a higher melting point than that of said set material in said cavity;

machining the plated layer such that the thickness thereof overlying said cavity is equal to the desired thickness of said thin wall;

heating said first member to melt said set material, said shim member being held in place by adhesion to said plated layer;

removing the melted material from said cavity; and removing said shim member from said cavity to provide said element, said thin wall being formed by the machined, plated layer, and said precisely shaped slit being formed by the removal of said shim member from said machined, plated, layer.

2. A method according to claim 1 wherein said shim member is fabricated of a metal different from said plated metal and from said first member, and wherein said shim is removed by etching with an etchant to which said plated metal layer is inert.

3. A method according to claim 1 wherein said first and second members are each metal.

4. A method according to claim 3 wherein said shim member is metal.

5. A method according to claim 4 wherein said settable composition is metal.

6. A method according to claim 1 wherein said cavity comprises a first, narrow, portion and a second, enlarged portion, said enlarged portion having an opening at said second surface of said first member provided with said thin wall having a precision shaped slit, said narrow portion extending from said enlarged portion and having an opening at said first surface of said first member.

7. A method according to claim 1 wherein said second member includes means for holding said first member in position thereon.

8. A method according to claim 1 wherein said shim member includes a shoulder abutting the surface of said second member when inserted in said slot.

9. A method according to claim 1 wherein the structure is metal and wherein said thin wall has a thickness of from 0.0005 inches to 0.05 inches.

10. A method according to claim 9 wherein the slit width in said thin wall is from 0.0005 to 0.05 inches.

* * * * *